United States Patent
Albrecht

(10) Patent No.: US 10,341,127 B2
(45) Date of Patent: Jul. 2, 2019

(54) ENHANCED COLLABORATION SERVICES

(71) Applicant: Microsoft Corporation, Redmond, WA (US)

(72) Inventor: Brian Thomas Albrecht, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 14/078,841

(22) Filed: Nov. 13, 2013

(65) Prior Publication Data

US 2015/0134737 A1    May 14, 2015

(51) Int. Cl.
| | | |
|---|---|---|
| *H04L 12/18* | (2006.01) | |
| *H04L 12/58* | (2006.01) | |
| *H04L 29/08* | (2006.01) | |

(52) U.S. Cl.
CPC ......... *H04L 12/1822* (2013.01); *H04L 51/32* (2013.01); *H04L 12/1818* (2013.01); *H04L 12/1827* (2013.01); *H04L 67/14* (2013.01); *H04L 67/306* (2013.01)

(58) Field of Classification Search
CPC ............... H04L 12/1818; H04L 67/306; H04L 12/1822; H04L 67/14
USPC .................................. 709/205, 204; 715/751
See application file for complete search history.

(56) References Cited

U.S. PATENT DOCUMENTS

| | | | |
|---|---|---|---|
| 6,629,129 B1 | 9/2003 | Bookspan et al. | |
| 7,487,158 B2* | 2/2009 | Castro | .................... G06Q 10/10 |
| 8,095,409 B2 | 1/2012 | Swanson | |
| 8,312,081 B2 | 11/2012 | Yuan et al. | |
| 8,397,168 B2 | 3/2013 | Leacock et al. | |
| 8,584,199 B1* | 11/2013 | Chen | ........................ H04L 67/06 |
| | | | 726/1 |
| 8,655,950 B2* | 2/2014 | Scherpa | .................. G06Q 10/10 |
| | | | 709/204 |
| 2006/0053196 A1* | 3/2006 | Spataro | ................ G06Q 10/107 |
| | | | 709/205 |

(Continued)

FOREIGN PATENT DOCUMENTS

| | | |
|---|---|---|
| CN | 102084354 A | 6/2011 |
| CN | 103338256 A | 10/2013 |

(Continued)

OTHER PUBLICATIONS

"International Search Report and Written Opinion Issued in PCT Patent Application No. PCT/US2014/064900", dated Jun. 3, 2015, 7 Pages.

(Continued)

*Primary Examiner* — Edward Kim

(57) ABSTRACT

Systems, methods, and software are disclosed herein in which a collaboration service registers users as participants in a collaboration session. As session content is received from at least one instance of various instances of a collaboration application engaged by the users, the collaboration service shares the session content with at least one other instance of the collaboration application. In addition, the collaboration service shares session information descriptive of at least a portion of the session content with at least one social network application associated with at least one user registered as one of the participants.

20 Claims, 9 Drawing Sheets

(56) References Cited

U.S. PATENT DOCUMENTS

| | | | |
|---|---|---|---|
| 2006/0053380 A1* | 3/2006 | Spataro | G06F 17/30011 715/753 |
| 2007/0005695 A1* | 1/2007 | Chen | H04L 12/1818 709/204 |
| 2007/0005698 A1* | 1/2007 | Kumar | G06Q 10/10 709/204 |
| 2009/0037534 A1* | 2/2009 | Castro | G06Q 10/10 709/205 |
| 2009/0070426 A1* | 3/2009 | McCauley | G06Q 10/10 709/205 |
| 2009/0234721 A1 | 9/2009 | Bigelow et al. | |
| 2010/0036929 A1* | 2/2010 | Scherpa | G06Q 10/10 709/207 |
| 2010/0138492 A1* | 6/2010 | Guzman | H04L 12/1818 709/204 |
| 2010/0235880 A1* | 9/2010 | Chen | H04L 63/102 726/1 |
| 2011/0035447 A1* | 2/2011 | George | H04L 67/306 709/205 |
| 2011/0289433 A1* | 11/2011 | Whalin | G06F 17/30964 715/753 |
| 2011/0314105 A1* | 12/2011 | Chen | G06Q 10/103 709/205 |
| 2012/0079396 A1* | 3/2012 | Neer | G06Q 10/107 715/745 |
| 2012/0084188 A1* | 4/2012 | Zuber | G06Q 10/10 705/34 |
| 2012/0084364 A1* | 4/2012 | Sivavakeesar | H04L 12/1818 709/205 |
| 2012/0204118 A1 | 8/2012 | Lefar et al. | |
| 2012/0210379 A1* | 8/2012 | McCoy | H04N 21/25808 725/109 |
| 2013/0055113 A1* | 2/2013 | Chazin | H04L 12/1822 715/758 |
| 2013/0103686 A1* | 4/2013 | Sisneros | G06F 17/30867 707/736 |
| 2013/0151301 A1 | 6/2013 | Robb | |
| 2013/0298041 A1* | 11/2013 | Lang | H04L 65/403 715/753 |
| 2013/0332524 A1* | 12/2013 | Fiala | H04W 4/50 709/204 |
| 2014/0019882 A1* | 1/2014 | Chew | G06Q 10/10 715/753 |

FOREIGN PATENT DOCUMENTS

| | | |
|---|---|---|
| CN | 103365955 A | 10/2013 |
| WO | 2012092025 A2 | 7/2012 |

OTHER PUBLICATIONS

"Live Meeting", Published on: Jan. 2005, Available at: http://download.microsoft.com/download/8/0/3/803f9ba6-5e12-4b40-84d9-d8a91073e3dc/LiveMeetingGuide.doc.

"Share Ideas with Anyone, Anywhere—Online", Retrieved on: Jun. 19, 2013, Available at: http://www.eplus.com/Collateral/Brochures/WebEx%20Meeting%20Center.pdf.

"GoToMeeting—Features", Published on: Sep. 2, 2012, Available at: http://www.gotomeeting.com/fec/online_collaboration.

"Office Action and Search Report Issued in European Patent Application No. 14812023.1", dated Jun. 16, 2017, 9 Pages.

"Office Action Issued in Chinese Patent Application No. 201480062444.6", dated Apr. 4, 2018, 12 Pages.

"Second Office Action Issued In Chinese Patent Application No. 201480062444.6", dated Dec. 3, 2018, 12 Pages.

* cited by examiner

ENHANCED COLLABORATION SERVICES

TECHNICAL FIELD

Aspects of the disclosure are related to computing hardware and software technology, and in particular, to enhanced collaboration applications and services.

TECHNICAL BACKGROUND

Collaboration software encompasses a wide range of solutions that enable users to work together on documents, to exchange information, and in interact many other ways. A wide variety of software tools and services may be considered collaboration software, such as productivity applications, email, and chat services. In fact, simply leveraging the invite feature of a calendar application to schedule a group meeting is an example of collaboration.

Some collaboration solutions allow users to interact in real-time to work on a shared document and in other, more extensive ways. For example, Microsoft® Lync® is a service through which online meetings can be hosted, during which documents can be shared and edited simultaneously, whiteboard sessions can be conducted, and chat, voice, and video communications can be exchanged, among other features.

Microsoft® Lync®, Google® Hangouts®, and other services for setting up and conducting online meetings are generally initiated on an ad-hoc basis or as a scheduled event. Ad-hoc collaboration sessions are created when two or more users spontaneously contact each other through a collaboration interface, possibly by sending instant messages or calling. They can then collaborate on content, share their desktops, and the like.

With respect to collaboration sessions that are scheduled, users can be invited to an event that is then stored in their calendar, usually with a link that connects to the online meeting. At the time of the event, a user can navigate to the online meeting through the event stored in their calendar by clicking on the link, which will connect them to the online meeting. Collaboration may then commence through an interface a collaboration service.

In both situations, no trace of the collaboration sessions remain after they are over, other than recordings that may have been made or other vestiges of them, such as an expired event that remains in a user's calendar. To remedy this, some solutions allow collaboration sessions to persist, such that interactions conducted during a meeting can be replayed at a later time, and so that content can be generated and edited asynchronously.

In any case, users typically participate in the collaboration sessions through the services or software solution that hosts the session. For instance, users access Lync® sessions through Lync® clients running locally, through a web browsers, or elsewhere.

Overview

Provided herein are systems, methods, and software for implementing collaboration services in which some participants may engage in collaboration sessions through instances of a collaboration application, while other participants may engage in collaboration sessions through a social network application.

In at least one implementation, a collaboration service registers users as participants in a collaboration session. As session content is received from at least one instance of various instances of a collaboration application engaged by the users, the collaboration service shares the session content with at least one other instance of the collaboration application. In addition, the collaboration service shares session information descriptive of at least a portion of the session content with at least one social network application associated with at least one user registered as one of the participants.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
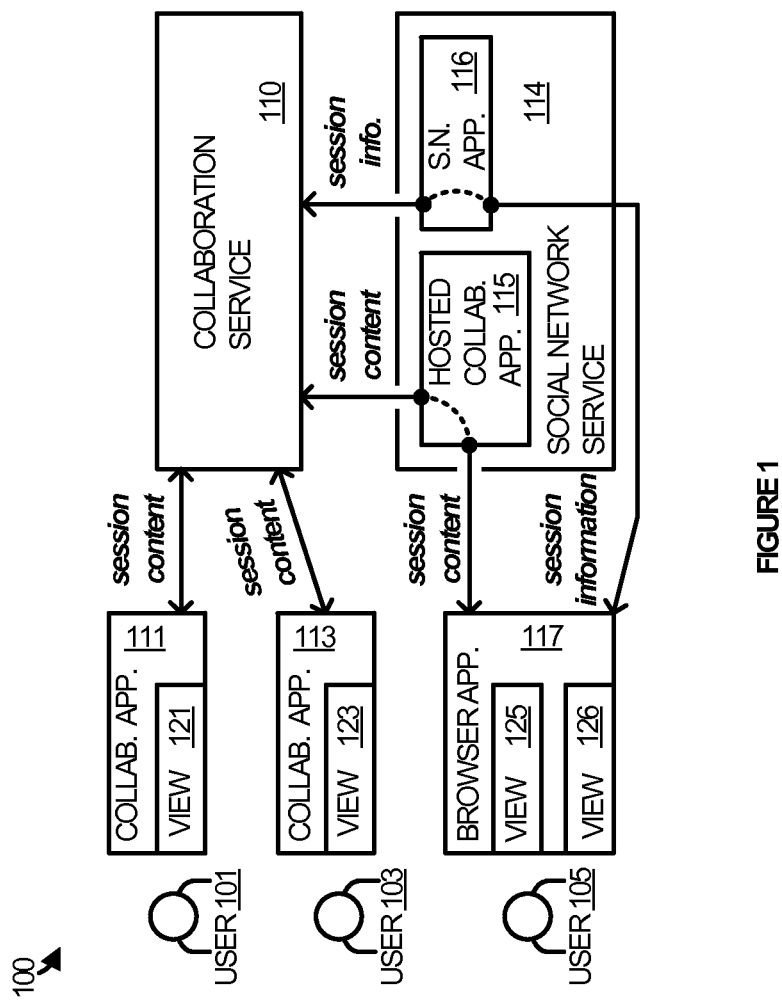
FIG. 1 illustrates an architecture for enhanced collaboration in an implementation.

Implementations disclosed herein enable enhanced collaboration services, in the context of which users may participate in collaboration sessions in a variety of ways. In various scenarios discussed below, users may register with a collaboration session and can then collaborate via instances of a collaboration application or in some other manner, such as through a social network application. In some cases an instance of the collaboration application may even be hosted within a social network service. Other ways for a user to participate in a collaboration session alongside those using a collaboration application are also possible, such as through a text-messaging service, a micro-blogging service, through an email service, or through some other suitable service or application. In this manner, users may participate in collaboration sessions in an ad-hoc or informal way without having to use a dedicated collaboration application.

The users may collaborate synchronously or asynchronously with each other in the context of a collaboration session. That is, users may interact with a collaboration session at the same time or at over lapping times. However, the users may also interact asynchronously such that users are interacting with collaboration sessions at entirely different times spaced apart from each other. In either case, the synchronous or asynchronous collaboration may occur using any of mechanisms mentioned above, including a collaboration application, test-messaging, blogging, and the like.

In at least one implementation, a collaboration service registers users as participants in a collaboration session. The users may register using a service identify, such as one associated with the collaboration service or an identity associated with a wider service. One example of such an identity is a user's Office 365 identity, Outlook.com identity, or other similar identity that may be provided in association with those services. The users may also register with some other identity, such as their identity associated with an email service or a social network. Other types of identities and other ways to register users are possible and may be considered within the scope of the present disclosure.

Once the users are registered with the collaboration service, they may participate in any given collaboration session to exchange content, provide comments, and otherwise collaborate on a topic, issue, or some other organizing entity. As part of this, the collaboration service receives session content from at least one instance of various instances of a collaboration application associated with the users. The users engage with the collaboration service by way of the instances of the collaboration application. For example, some users may engage through locally installed versions of the collaboration application, while others may engage through streaming or web-based versions of the collaboration application. Other instances may include mobile versions, tablet versions, or any other variation or combination thereof through which a user may engage the service.

As any given user generates session content through one of the instances of the collaboration application, the collaboration service shares the session content with at least one other instance of the collaboration application. Examples of session content that may be shared include, but are not limited to, documents, edits to documents, comments, notes, virtual sticky notes, white board content, voice or video clips, and any other type of content suitable for sharing within the context of a collaboration session.

In addition to sharing the session content with another instance of the collaboration application, the collaboration service also shares session information with at least one social network application that is associated with at least one user. The session information may describe the session content in a variety of ways, such as by describing the type of the content, what action occurred with respect to the content, which user performed the action with respect to the content, or any facet of the session content. In a brief example, were one user to edit a document associated with a collaboration session, associated session information may alert a user through a social network application that the edit occurred, and possibly alert the user to which other user performed the edit. Examples of the social network application include, but are not limited to, a posting function associated with a user's wall in their user profile, a messaging function associated with a social network service, a news feed associated with a social network service, and the like. It may be appreciated that such session information could be communicated in other ways and to other types of external services, such as by sending the session information in a text message via a text message service to a user, by sending the session information in an email to a user, by posting the session information in a feed to a micro-blogging service, or in any other manner.

Additional session information is shared in some scenarios that is associated with a user engaged with a collaboration session via a social network. The additional session information may be input via the user's wall, blog posts, or some other feature, and communicated to the collaboration service for distribution to other users. In a scenario where session information has been posted to a user's wall, the user may reply to the post and that reply can be communicated to and shared by the collaboration service. Other users may then view the reply through their instances of a collaboration application, whether running as a stand-alone application, within the context of another service, or the like.

In some implementations, instances of a collaboration application include a hosted instance that is hosted within a social network service. Some social network services allow for applications to be produced and hosted within the service. In such situations, a collaboration application designed for such an environment may allow a user to interface with a collaboration service from within a social network service. An instance of a collaboration application that is hosted by a social network service may be a reduced-functionality version of the collaboration application, relative to other instances or versions of the collaboration application. However, in some scenarios the hosted instance may be a full-featured version with the same or more capabilities as any other instance. Session content, and any additional session content, can be originated from or shared with any instance of a collaboration application that is hosted in a social network service.

It may be appreciated that, given the flexibility with which users may engage with a collaboration session, a user may register to participate in a session under any one or possibly multiple identities. For example, a user may register to participate in a session using an identity associated with a collaboration service, but may also register with their social network identity. In this manner, the user can access session content through a full-featured experience provided by an instance of a collaboration application, or through a less formal experience provided by the various features and tools of a social network service. A user may also register or otherwise sign-in through any instance of a collaboration application (including an instance hosted in a social network).

However, in a scenario where a user engages through a social network feature, or any feature of any other external service, the user may easily collaborate using those feature or tools without having to sign-in separately to a collaboration service. For instance, a user may have already established access to their social network profile and its associated features and tools. The user may view session information and provide additional session information through those features, using their social network identity.

A user interface to a collaboration service is provided in some implementations by any instance of a collaboration application. In such implementations, the user interface includes a home view and various collaboration views. The home view includes interface elements through which to navigate to any of the collaboration views to participate in collaboration sessions. Selecting one of interface elements launches a corresponding one of the collaboration views. Each collaboration view may be associated with a different one of the collaboration sessions and may also include interface elements through which to engage the collaboration service to participate in the sessions.

In some scenarios, the interface elements in the home view include a graphic selectable to navigate to a corresponding one of the collaboration views. The collaboration service may include various features and each of the interface elements in the collaboration view may be a graphic selectable to engage a different one of the features. Examples of the features include, but are not limited to, a content feature, a contacts feature, a whiteboard feature, a notes feature, and various communication features. Thus, the interface elements in the collaboration view may include a content element selectable to open a content application to access content, a contacts element selectable to open a contacts application to access contacts, a whiteboard element selectable to open a white board application, and various communication elements, each of which may be selectable to invoke a different one of the various communication features. In some implementations, the communication features include a voice calling application associated with a voice calling service, a video calling application associated with a video calling service, a calendar application associated with a calendar service, and a chat application associated with a chat service. Examples of session content include a document or documents available through a content application for participants in a collaboration session to edit, contacts having contact information for the participants and with which to communicate via the communication features.

In some implementations, a participant may be reminded about a collaboration session when working outside of a collaboration service. In one example, session activity is monitored for each of the participants in of each various collaboration sessions to identify flagged participants. Local activity is monitored for at least one participant and a notice is surfaced to the one participant when the local activity is associated with any of the flagged participants. In another example, session activity is monitored to identify flagged content. Local activity is monitored for the one participant and a notice is surfaced when the local activity is associated with any of the flagged content.

Figure 2:
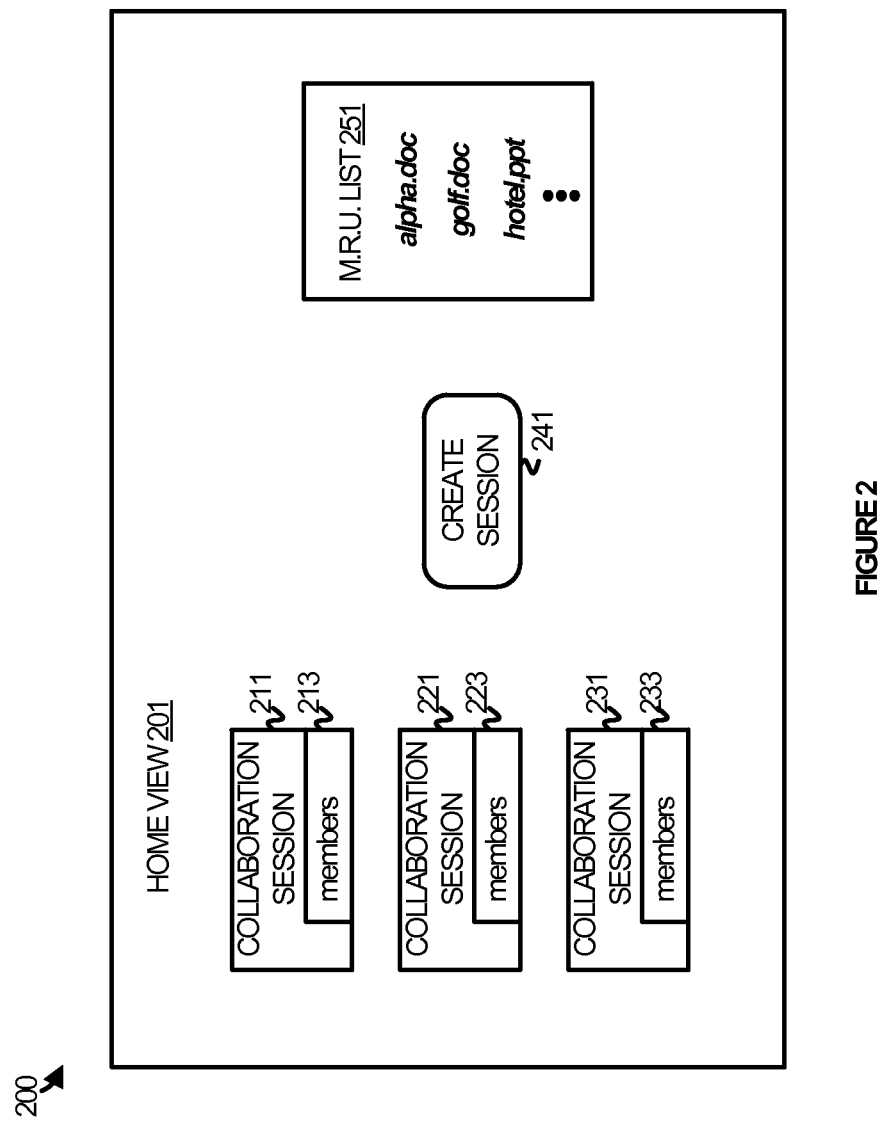
FIG. 2 a home view to a collaboration service in an implementation.
Figure 3:
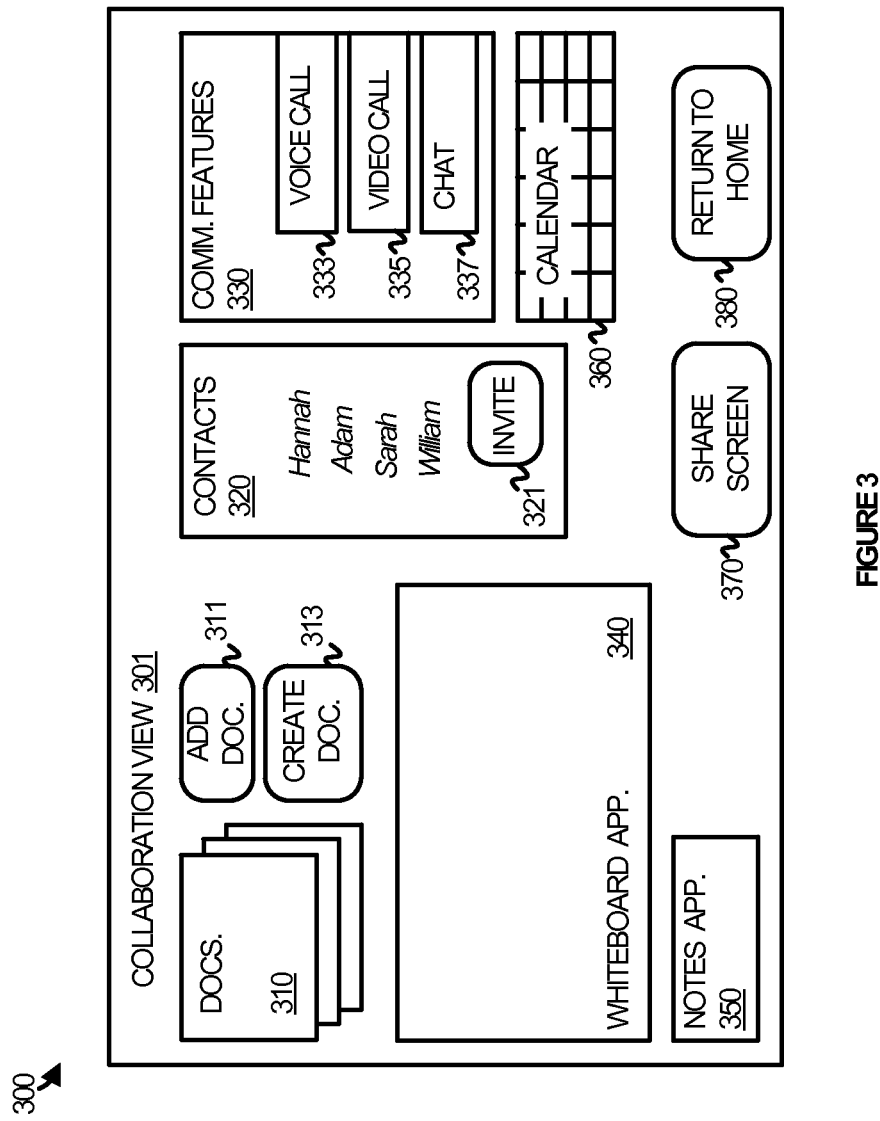
FIG. 3 a collaboration view to a collaboration service in an implementation.
Figure 4:
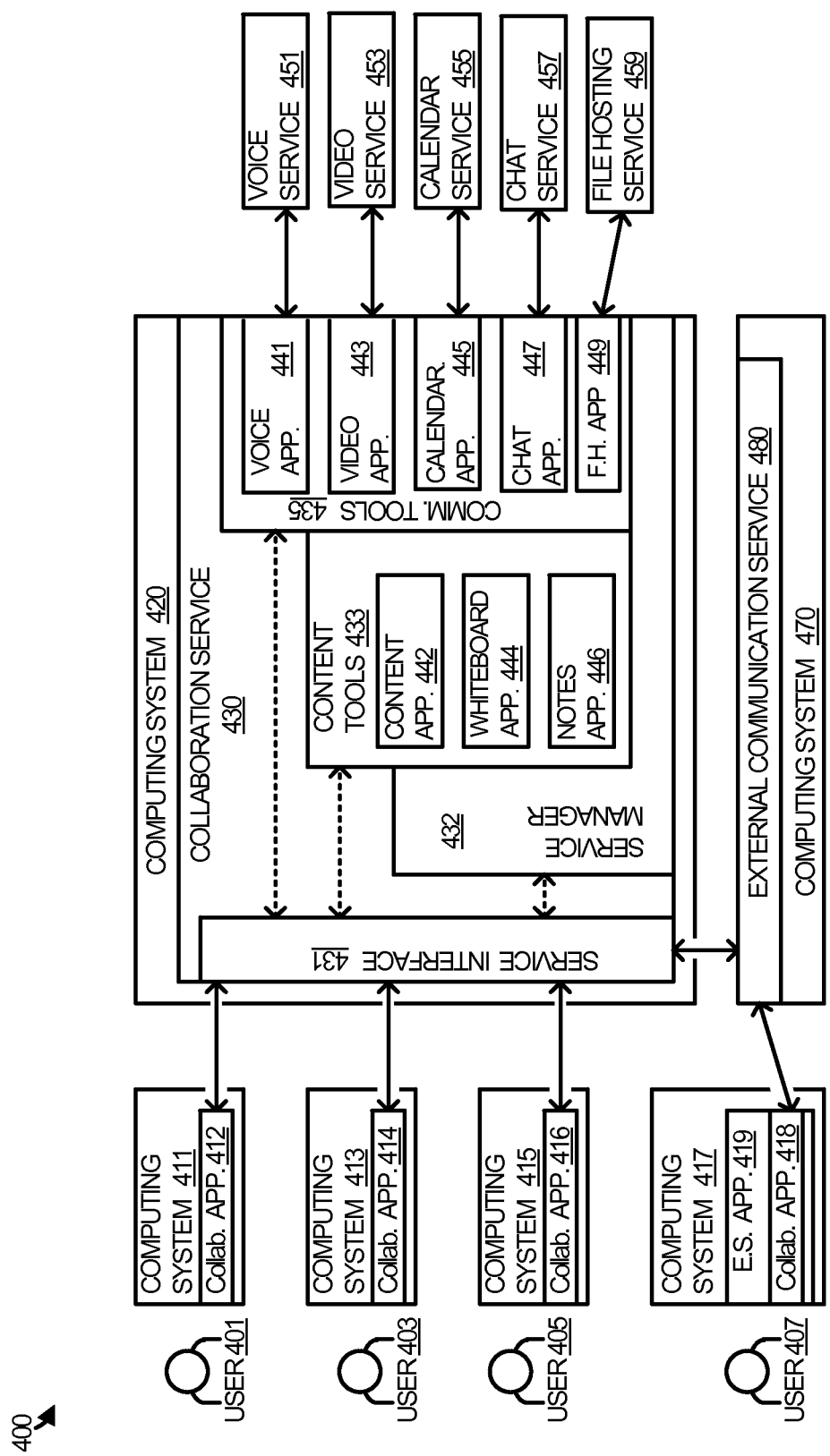
FIG. 4 illustrates an architecture for enhanced collaboration in an implementation.
Figure 5:
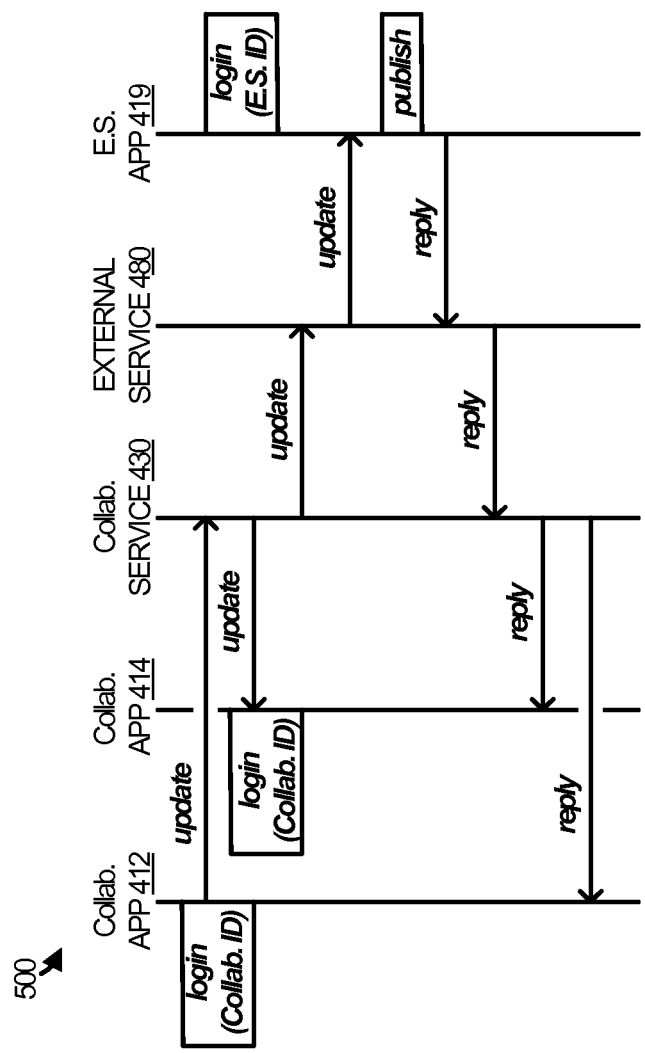
FIG. 5 illustrates a collaboration scenario in an implementation.
Figure 6:
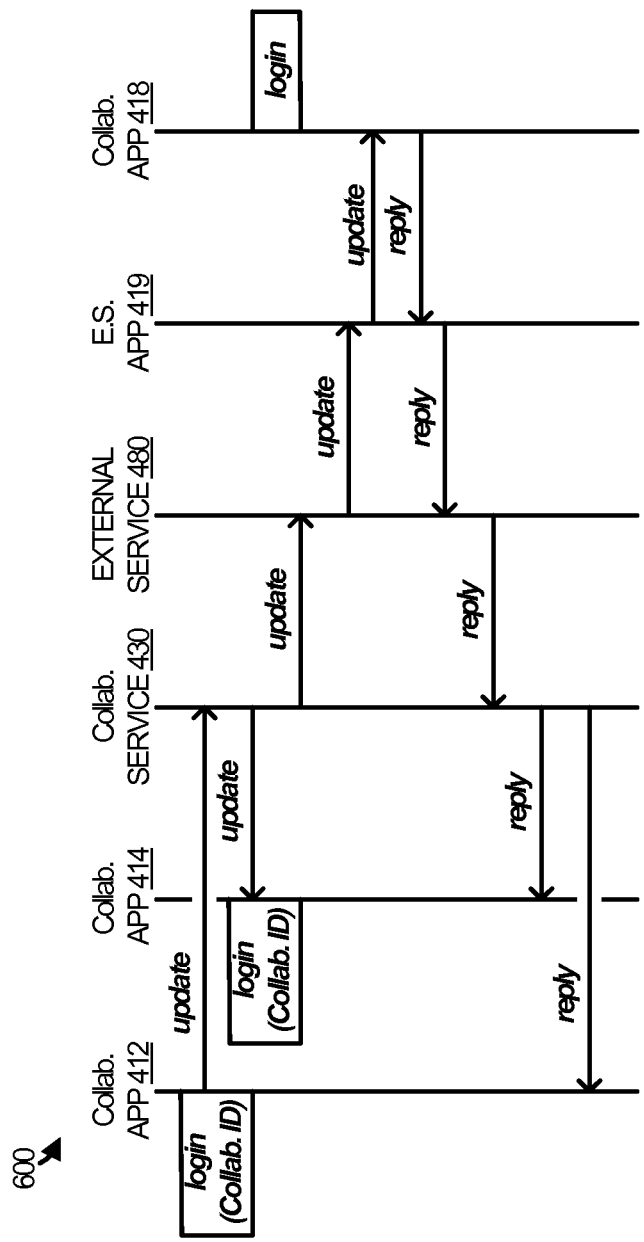
FIG. 6 illustrates a collaboration scenario in an implementation.
Figure 7:
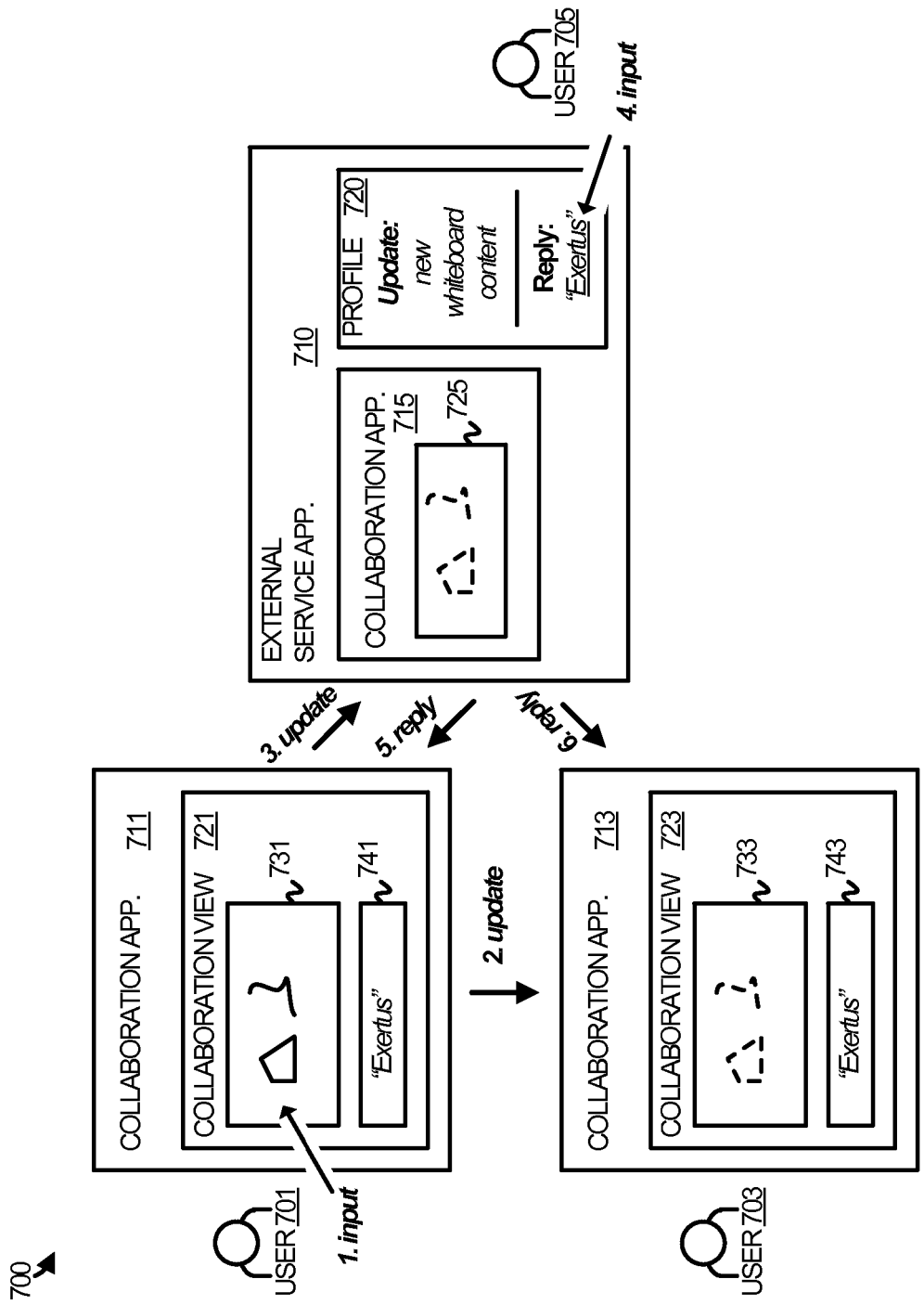
FIG. 7 illustrates a collaboration scenario in an implementation.
Figure 9:
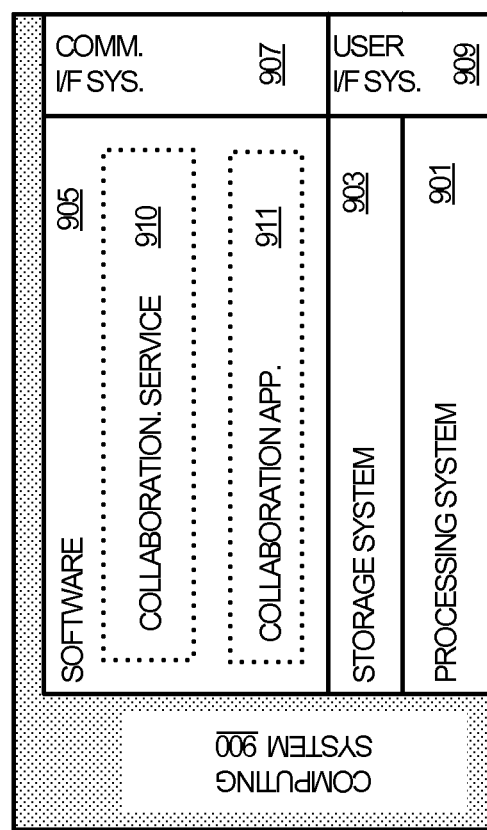
FIG. 9 illustrates a computing system in an implementation for implementing a collaboration service or collaboration application in various implementations.

Referring now to the drawings, FIG. 1 illustrates an architecture for enhanced collaboration. FIG. 2 illustrates a home view in a user interface to a collaboration service, while FIG. 3 illustrates a collaboration view to the same. FIG. 4 illustrates another architecture for enhanced collaboration, while FIGS. 5-7 illustrate various collaboration scenarios that may occur within the context of such an architecture. FIG. 9 illustrates a computing system representative of those suitable for implementing either or both of a collaboration service and a collaboration application.

Turning to FIG. 1, architecture 100 includes a collaboration service 110 in communication with collaboration application 111. Collaboration application 111 provides user 101 with a view 121 of collaboration service 110. Collaboration application 113 provides user 103 with a view 123 of collaboration service 110. Collaboration application 111 and collaboration application 113 may be instances of the same collaboration application, different collaboration applications, variations of a collaboration application, or combinations thereof. It may be appreciated that other instances of a collaboration application are possible, in addition to or in place of those disclosed herein, and may be considered within the scope of the present disclosure.

In addition, collaboration service 110 is in communication with social network service 114 and, in particular, with a hosted collaboration application 115 within the social network service 114. Social network service 114 also includes social network application 116 with which collaboration service 110 may be in communication. Host collaboration application 115 provides a view 125 of collaboration service 110 to user 105 by way of browser application 117. User 105 is also provided with a social network view 126 of social network service 114 by social network application 116 through browser application 117.

Collaboration service 110 is representative of any service through which users may collaborate on content, such as by sharing content, sharing edits, sharing comments, or otherwise interacting in a collaborative manner. Examples of collaboration service 110 include, but are not limited to, Microsoft® Lync®, Google® Hangouts®, WebEx®, and GoToMeeting®, as well as any other type of collaboration service, variation of service, or combination thereof. In some implementations, a collaboration service may be integrated within another service, such as productivity service, communication service, or the like. Collaboration service 110 may be implemented by any suitable physical or virtual computing system or collection of computing systems, or any combination or variation thereof, of which computing system 900 is representative.

Collaboration application 111 is representative of any instance of a collaboration application capable of providing a user with a view 121, by way of a user interface, to collaboration service 110. Examples of collaboration application 111 include client applications associated with the aforementioned collaboration services. Collaboration application 111 may be implemented as a locally installed application, a hosted application executed within the context of a browser, as a streaming application, as a desktop application, a mobile application, or in some other manner, variation, or combination thereof. Various types of physical computing systems may be used to implemented collaboration application 111, of which computing system 900 is representative.

Collaboration application 113 is also representative of any instance of a collaboration application capable of providing a user with a view 131, by way of a user interface, to collaboration service 110. Examples of collaboration application 113 include client applications associated with the aforementioned collaboration services. Collaboration application 113 may be implemented as a locally installed application, a hosted application executed within the context of a browser, as a streaming application, as a desktop application, a mobile application, or in some other manner, variation, or combination thereof. Various types of physical computing systems may be used to implemented collaboration application 113, of which computing system 900 is representative.

Social network service 114 is representative of any social network service within which a hosted collaboration application may be implemented. Examples of social network service 114 include, but are not limited to, Facebook®, Google+®, LinkedIn®, and Orkut®, as well as any other social network service, variation, or combination thereof. Social network application 116 is representative of any application feature or functionality that may be experienced with respect to social network service 114. Examples of social network application 116 include, but are not limited to, a wall in a user profile on which comments may be posted and replied to, a message feature in a user profile through which messages may be exchanged, a news feed through which information may be posted, or a blog or micro-blog on which commentary and other information may be posted and replied to, as well as any other suitable feature or function, variation, or combination thereof. It may be appreciated that social network service 114 may include other social network applications in place of or in addition those disclosed herein.

Hosted collaboration application 115 is representative of any instance of a collaboration application capable of being hosted within social network service 114 and providing a user with a view 125, by way of a user interface, to collaboration service 110. In some scenarios, hosted collaboration application 115 may be executed within the context of browser application 117. However, in other scenarios all or a portion of hosted collaboration application may be executed within the context of social network service 114. In still other scenarios, host collaboration application 115 may be distributed between browser application 117, or some other local resource, and social network service 114. Accordingly, hosted collaboration application 115 may be implemented using any physical or virtual computing system or collection of computing systems, of which computing system 900 is representative.

In operation, user 101 and user 103 may engage with collaboration service 110 by way of collaboration application 111 and collaboration application 113 to participate in one or more collaboration sessions. A view 121 to collaboration service 110, and to any given collaboration session with which user 101 is associated, is rendered and presented to user 101 by a suitable computing system. A view 123 to collaboration service 110 and any given collaboration session with which user 103 is associated may also be rendered and presented to user 103 by a suitable computing system. For exemplary purposes, it may be assumed that user 101 may participate in at least one collaboration session in common with user 103, although one or both users may participate in other session, in common or not.

In general, users 101 may generate and consume session content through view 121, including sharing session content with user users, such as user 103. Collaboration application 111 communicates session content generated through view 121 to collaboration service 110 for distribution to other instances of a collaboration application. Content generated via those other instances, such as collaboration application 113, may be communicated to collaboration service 110 and shared with user 101 via collaboration application 111 and view 121.

In a brief example, user 101 may edit a document that is shared with other participants in a collaboration session, including user 103. In addition to sharing the document, the edits may also be shared. Moreover, many other types of content and modes of sharing are possible, including posting brief notes, chatting, uploading or downloading documents, participating in real-time communications, or the like.

In addition to user 103, user 105 may also be a participant in a collaboration session with user 101. Thus, the same session content share between user 101 and user 103 via collaboration application 111 and collaboration application 113 respectively, may be shared with user 105 through hosted collaboration application 115. In such a scenario, collaboration service 110 communicates session content with hosted collaboration application 115 in social network service 114 which, in turn, communicates the session content to browser application 117. Browser application 117 renders the session content, or some variation thereof, in view 125.

User 105 may also engage with collaboration service 110 in other ways, such as through social network application 116. In such a scenario, session information descriptive of session content that is being shared within the context of a collaboration session is communicated from collaboration service 110 to user 105 through social network application 116. For example, session information might indicate that an edit occurred with respect to a document shared in a collaboration session. The fact of the event—that a document was edited—may be communicated through social network application 116 and presented to user 105 in social network view 126.

It may be appreciated that, while architecture 100 illustrates user 105 as associated with both view 125 and social network view 126 in browser application 117, such an arrangement is optional and alternatives are possible. For example, a given user may engage with collaboration service 110 via a social network application without also using a hosted collaboration application to participate. In another example, a given user may engaged with collaboration service 110 via hosted collaboration application 115 without using a social network application to participate.

FIG. 2 illustrates a user interface 200 that may be presented to a user when interfacing with an instance of a collaboration application, such as collaboration application 111 and collaboration application 113 experienced by user 101 and user 103 respectively. User interface 200 may also be representative of a user interface produced by hosted collaboration application 115, although in some implementations its user interface may be limited or have reduced functionality relative to others. User interface 200 may be rendered by a suitable computing system executing all or portions of an instance of a collaboration application, of which computing system 900 is representative.

User interface 200 includes a home view 201 of a collaboration service. Home view 201 may be encountered by a user when initially launching an instance of a collaboration application provides a base from which the user may navigate to other view. Home view 201 includes various interface elements selectable through user interface 200 to navigate to various aspects of the collaboration service.

In particular, home view 201 includes interface element 211, interface element 221, and interface element 231, each of which is selectable by a user to navigate to one of various collaboration sessions, in which the user participates. Home view 201 also includes interface element 213, interface element 223, and interface element 233 corresponding respectively to interface element 211, interface element 221, and interface element 231. Each of interface element 213, interface element 223, and interface element 233 is selectable to view the participants in a corresponding collaboration session. Interface element 241 is also included in home view 201, with which a user may create a collaboration session. A most-recently-used list 251 provides a quick reference tool through which a user may access session content recently shared in any of their collaboration sessions.

Any of the interface elements in home view 201 may be, for example, a graphic selectable by way of some user input, such as a touch, a gesture, a mouse click, keyboard input, speech input, or any other suitable user input or combination of inputs. Other examples include hyper-links, menus from which selections may be made, and the like.

As mentioned, a user may be presented with home view 201 upon launching or otherwise starting a collaboration application in order to engage with a collaboration service. In order to commence use, the user in some scenarios may have to register with the collaboration service. This could be accomplished in a variety of ways, such as by prompting the user for an identity and possibly a password. In some implementations, the identity may be associated with the collaboration service, but may also be associated with an over-arching or umbrella service associated with the service. For example, a user may register with their Microsoft® Office 365® identity or their Gmail® identity. In various scenarios the user may already be logged from a previous encounter with the collaboration service, an umbrella service, or for some other reason.

Regardless, in some manner a user's identity is communicated to a collaboration service such that interface elements corresponding to the user's collaboration sessions can be rendered in home view 201. The user may select any of the given interface elements 211, 221, and 231 in order to navigate to a collaboration view of the collaboration session. FIG. 3 illustrates one such collaboration view 301 as an example.

Collaboration view 301 includes another set of interface elements selectable to invoke various features supported by a collaboration service. Users may thus engage with the various features of a collaboration service through the interface elements of collaboration view 301. The features of the collaboration service allow users to share a variety of session content with each other in a variety of ways, such as by opening, adding, or creating documents, writing within a whiteboard application, producing notes, initiating calendar events, sharing their screens, or communicating using a variety of communication services. Any number of other features and functionality for facilitating collaboration may be surface through collaboration view 301 and may be considered within the scope of this disclosure.

Interface element 310 may be selected to open a document and invoke a document application. Interface element 311 may be selected to add a document to a collaboration session represented in collaboration view 301. Selecting interface element 311 to add a document may invoke, for example, a file hosting service to which a document may be uploaded or from which a document may be obtained. Interface element 313 serves to invoke a create document feature with which a user may create documents within the context of a collaboration session.

Collaboration view 301 also includes contacts 320 providing contact information with which a user may establish communications. An interface element 370 functions to invoke an invitation feature that allows a user to invite others to participate in an associated collaboration session. Contacts 320 may include contact information for those participants invited to and registered with the collaboration session.

A user may take advantage of various communication features 330 to communicate with other participants in a communication session. Various communication services represented by communication features 330 may be invoked by selecting their corresponding interface elements. Interface element 333 invokes a voice calling service; interface element 335 invokes a video calling service; and interface element 337 invokes a chat or instant messaging service. In some implementations, application software associated with a selected communication service may launch and run within the context of collaboration view 301 or otherwise running within the context of a collaboration application. However, in other implementations selecting an interface element corresponding to a particular communication service launches associated application software outside of collaboration view 301, possibly as an entirely separate application apart from any associated collaboration application. Other communication services in addition to or in place of those disclosed with respect to collaboration view 301 are possible and may be considered within the scope of the present disclosure.

Collaboration view 301 also includes a notes application 350 with which a user may post notes within a collaboration session. The notes would then be visible for other users to see when engaged with their instance of collaboration view 301. Other interface elements include interface element 360, selectable to invoke a calendar application; interface element 370, selectable to invoke a share screen feature; and interface element 380, selectable to navigate a user back to home view 201.

Other interface elements are possible in addition to or in place of those disclosed with respect to collaboration view 301. In addition, any of the interface elements in collaboration view 301 may be, for example, a graphic selectable by way of some user input, such as a touch, a gesture, a mouse click, keyboard input, speech input, or any other suitable user input or combination of inputs. Other examples include hyper-links, menus from which selections may be made, and the like.

FIG. 4 illustrates an architecture 400 for enhanced collaboration in another implementation. Architecture 400 includes various computing systems 411, 413, 415, and 417 with which various users 401, 403, 405, and 407 respectively may engage with a collaboration service 430 implemented on another computing system 420. Computing systems 411, 413, and 415 implement collaboration applications 412, 414, and 416 respectively to facilitate the users' access to collaboration service 430. Computing system 417 implements an external service application 419, within the context of which collaboration application 418 is hosted and runs.

Collaboration applications 412, 414, and 416 may each be a locally installed and executed application, a hosted application running within the context of a browser or some other application, a streaming application, a mobile application, a desktop application, or any other type of application, variation, or combination thereof. External service application 419 may be any application capable of interfacing with external communication service 480 running on computing system 470.

Collaboration service 430 includes various service elements that function to provide users 401, 403, 405, and 407 with enhanced collaboration features in support of collaboration sessions. Service interface 431 provides a link through which collaboration applications 412, 414, and 416 may communicate with any or all of service manager 432, content tools 433, and communication tools 435. In addition, service interface 431 provides a link through which external communication service 480 may facilitate communication with collaboration application 418. External communication service 480 may be any service generally considered external to collaboration service 430, such as a social network service, a blogging service, or any other external service.

Service manager 432 functions to manage collaboration sessions, such as by creating sessions, inviting participants to join a session, registering participants with collaboration service 430, and potentially managing participant interaction with content tools 433 and communication tools 435. Content tools 433 include various applications that may be invoked through a collaboration view to collaboration service 430. Content tools 433 includes content application 442, whiteboard application 444, and notes application 446. In a brief example, a collaboration view to collaboration service 430 rendered by any of collaboration applications 412, 414, 416, and 418 may include various graphics corresponding to each of the content tools 433. Selecting any given graphic may invoke a corresponding one of the content tools. The selected content tool, such as whiteboard application 444, may then be downloaded to the computing system associated with the requesting collaboration application to allow a user to engage with a collaboration session using a virtual whiteboard.

Communication tools 435 includes voice application 441, video application 443, calendar application 445, chat application 447, and file hosting application 449. A collaboration view to collaboration service 430 rendered by any of collaboration applications 412, 414, 416, and 418 may include various graphics corresponding to each of the communication tools 435. Selecting any given graphic may invoke a corresponding one of the content applications. The selected communication application, such as voice application 441, may then be downloaded to or otherwise enabled with respect to the computing system associated with the requesting collaboration application to allow a user to engage with a a corresponding voice service 451. In fact, each of the communication tools 435 is generally associated with a communication service through which communications may be handled. Voice application 441 is associated with voice service 451, video application 443 is associated with video service 453, calendar application 445 is associated with calendar service 455, chat application 447 is associated with chat service 457, and file hosting application 449 is associated with file hosting service 459, and so on.

Computing systems 411, 413, 415, and 417 may each be any physical or virtual computing system or systems capable of implementing a collaboration application, of which computing system 900 is representative. Computing system 420 may be any physical or virtual computing system or systems capable of implementing collaboration service 430, of which computing system 900 is representative. Computing system 470 may also be implemented using any suitable physical or virtual computing system or systems.

FIG. 5 illustrates a collaboration scenario 500 in an implementation involving architecture 400. In operation, user 401 operating computing system 411 logins to collaboration service 430. This may occur directly, such as when collaboration application 412 is initially launched or when the user is logged in from a previous session. However, the user may also be logged in indirectly, such as through a credentialing service that manages login procedures for multiple services. Regardless, the user logs in with a collaboration identity that is associated either directly or indirectly with collaboration service 430.

When logged into collaboration service 430, user 401 may interact with various content items within a collaboration session, such as documents, a whiteboard space, notes, and the like. Actions taken by user 401 that are reflected in changes to some of the content are communicated as an update or updates from collaboration application 412 to collaboration service 430. For example, if user 401 were to generate a virtual sticky-note, an update indicative of as much would be communicated to collaboration service 430.

In the meantime, it is assumed for exemplary purposes that user 403 and user 407 have also logged into collaboration service 430 and are engaged with the same collaboration session as user 401. User 403 logs in using a collaboration identity similar to user 401. However, in this example user 407 logs in using an extended service identity. For example, user 407 may log into a social network account with a social network service.

The update reflective of changes made by user 401 is communicated to collaboration application 414 to be presented to user 403. The update is also communicated for presentation to user 407, but through external communication service 480 and external service application 419. Extended service application 419 publishes the update via some feature of external communication service 480 for consumption by user 407, such as by posting session information to a wall in a social network profile, posting session information to a blog, sending a text message indicative of session information, or in some other manner.

User 407 replies to the update through the same mechanism by which the update is published. For example, user 407 may input a reply via a wall in a social network profile, input a text message reply, or post a response in a blog. The reply is communicated through external communication service 480 to collaboration service 430 for distribution to other users. Collaboration application 414 receives and presents the reply to user 403 and collaboration application 412 presents the reply to user 401.

To facilitate the communication of updates, replies, and other session information in an external service, collaboration service 430 may in some scenarios be capable of registering as a node in the external service. For example, upon inviting user 407 to join a collaboration session, collaboration service 430 may generate an identity associated with the collaboration session. That identity, representative of the collaboration session, can join the external service. Other members of the external service, such as user 407, may be linked to the identity in the external service such that session information can be exchanged.

In a brief example, user 401 may invite user 407 to join a collaboration session using a social network identity associated with user 407. Collaboration service 430 can create a social network identity in a social network that is associated with the collaboration service. The social network identity of the collaboration session can then link to the social network identity of user 407, such as by inviting user 407 to be friends or in some other manner. Having established a link in the social network, collaboration service 430 is able to post session information to the wall of user 407 and receive replies from user 407 through the wall. The replies can be processed and rendered in some consumable form in the collaboration view associated with the collaboration session that is experienced by other users accessing the collaboration session through a collaboration application.

However, user 407 may engage with the collaboration session in other ways, such as through collaboration application 418, an example of which is illustrated in FIG. 6. In collaboration scenario 600, user 401 may interact with various content items within a collaboration session, such as documents, a whiteboard space, notes, and the like. Actions taken by user 401 that are reflected in changes to some of the content are communicated as an update or updates from collaboration application 412 to collaboration service 430. For example, if user 401 were to generate a virtual sticky-note, an update indicative of as much would be communicated to collaboration service 430.

It is assumed for exemplary purposes that user 403 and user 407 have also logged into collaboration service 430 and are engaged with the same collaboration session as user 401. User 403 logs in using a collaboration identity similar to user 401. However, user 407 may login using a similar identity or using an extended service identity. For example, user 407 may log into a social network account with a social network service. As such, user 407 may engage with collaboration service 430 via collaboration application 418 running within extended service application 419.

The update reflective of changes made by user 401 is communicated to collaboration application 414 to be presented to user 403. The update is also communicated for presentation to user 407, but through external communication service 480 and extended service application 419. Extended service application 419 communicates the update to collaboration application 418, which may then render it for consumption by user 407.

User 407 can reply to the update, such as by making additional edits to a document, writing on a virtual white board, or posting a virtual sticky-note. That reply is communicated via extended service application 419 and external communication service 480 to collaboration service 430. Collaboration service 430 may then distribute the reply to collaboration application 412 and collaboration application 414 for consumption by user 401 and user 403 respectively.

FIG. 7 illustrates another collaboration scenario to bring into better relief the preceding collaboration scenarios. In collaboration scenario 700, a user 701 interacts with a collaboration application 711 to engage with user 703 and user 705 in a collaboration session. User 701 inputs content through collaboration view 721 into a virtual white board 731 provided by a virtual white board application. In this example, two items are drawn by user 701 which are then communicated as updates to collaboration application 713 and collaboration application 715, running within external service application 710.

Collaboration application 713 renders the session content communicated in the reply in collaboration view 723. Collaboration view 723 includes a virtual white board 733 in which the items drawing by user 701 can be reproduced for consumption by user 703. Collaboration application 715 is also capable of rendering the items communicated in the update within another virtual white board 725 for consumption by user 705.

In addition to reproducing the items in virtual white board 725, session information is also communicated to external service application 710 for posting within a profile 720 to user 705. In this example, a message is posted that informs user 705 that new whiteboard content has been generated. User 705 thus is informed of the event and can navigate within external service application 710 to collaboration application 715 to view the white board drawing. User 705 may also reply to the update that was posted. In this example, user 705 inputs a text string that is communicated as a reply to collaboration application 711 and collaboration application 711. As illustrated, the reply is posted in an element 741 in collaboration view 721 and in an element 743 in collaboration view 723.

The foregoing example thus illustrates that session content can be easily shared between instances of a collaboration application (collaboration applications 711 and 713), but can also be communicated across service borders to another instance running within the context of an external service. In addition, session information related to the session content may be communicated by other channels for consumption by users that are not necessarily logged into or officially engaged with a collaboration service, such as by posting session information to a social network wall and accepting and distributing replies through the wall.

Figure 8:
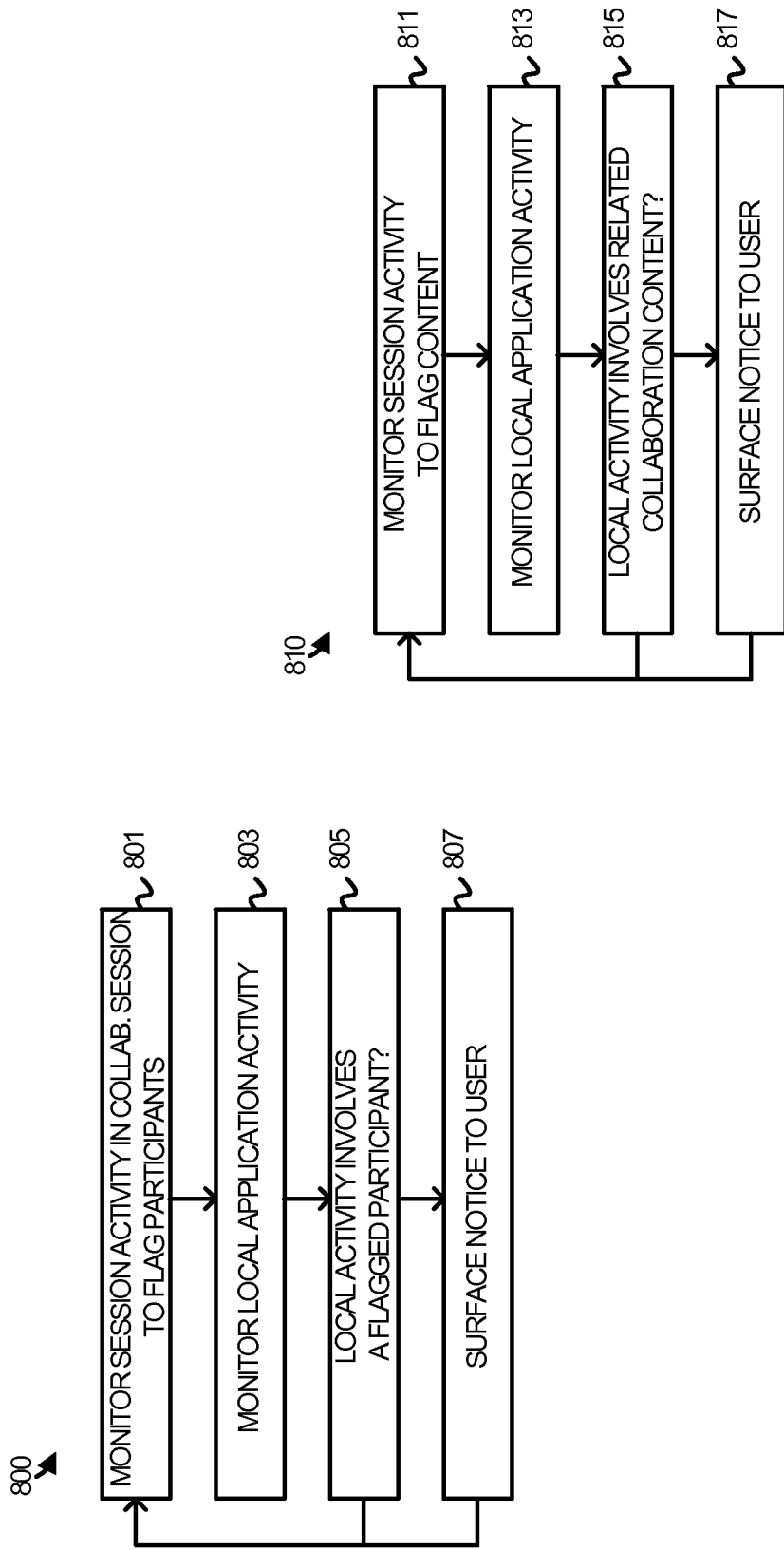
FIG. 8 illustrates two exemplary collaboration processes.

FIG. 8 illustrates two collaboration processes, collaboration process 800 and collaboration process 810, the may be employed to remind a participant about a collaboration session when working outside of a collaboration service. Collaboration process 800 and collaboration process 810 may be employed in the context of, for example, an umbrella service within which a collaboration service may be offered, an example of which includes, but is not limited to, Microsoft® Office 365®.

Referring parenthetically to the steps of collaboration process 800, a service implemented on a suitable computing system or collection of systems monitors session activity in a collaboration session to flat participants (step 801). For example, a session may include five participants, only a few of whom ever participate in the session. The remaining two users may be identified for flagging. In another example, the inverse may occur where participants who routinely or frequently participate in the session are flagged.

Local application activity for one of the participants can then be monitored (step 803), such as by examining who the participant is emailing, sharing documents with, or the like. Who the participant is engaged with through local application activity may be examined to determine if their actions involve one of the flagged session participants (step 805). If so, a notice can be surfaced to the participant reminding them of their association with the other participant by way of the collaboration session. In an instance where the other person rarely engages in the collaboration session, such a notice may prompt the participant to remind or otherwise inform the person about the session.

In collaboration session 810, session activity is also monitored (step 811), but in order to flag content. For example, a service may monitor for which documents or images or uploaded to our exchanged within the context of a collaboration session. Local application activity may then be monitored with respect to a participant (813). The local activity is examined to determine if it directly or possibly indirectly relates to the flagged collaboration content (step 815). If so, a collaboration reminder or other such notice may be surfaced to a user alerting or reminding them about the relationship between the content and the session.

It may be appreciated that collaboration process 800 and collaboration process 810 are optional. In addition, the monitoring steps discussed with respect to both processes are optional and a user could opt-in to such functionality or could opt-out such that their local application activity could not be monitored. Collaboration process 800 and collaboration process 810 may be implemented by any suitable computing system or collection of systems, of which computing system 900 is representative.

FIG. 9 illustrates computing system 900, which is representative of any suitable computing system or collection of systems that may be employed to implement all or portions of architecture 100 or architecture 400. For example, computing system 900 may be used to implement all or portions of collaboration service 110 and collaboration service 430, represented by collaboration service 910. Examples of computing system 900 include server computers, rack servers, web servers, cloud computing platforms, and data center equipment, as well as any other type of physical or virtual server machine, and any variation or combination thereof. In some implementations, a collection of multiple computing systems may be employed to implement all or portions of a collaboration service which may be hosted in one or more data centers, virtual data centers, or any other suitable computing facilities.

Computing system 900 is also representative of any suitable computing system that may be employed to implement all or portions of collaboration applications 111, 113, 412, 414, 416, and 418, represented by collaboration application 911. Computing system 900 is also representative of any computing system suitable for implementing any of the user interfaces 200 and 300, and operational scenarios and sequences described herein, such as collaboration scenarios 500, 600 and 700, and collaboration processes 800 and 810. Examples of computing system 900 also include, but are not limited to, desktop computers, laptop computers, tablet computers, notebook computers, mobile computing devices, cell phones, media devices, and gaming devices, as well as any other type of physical or virtual computing machine.

Computing system 900 may be implemented as a single apparatus, system, or device or may be implemented in a distributed manner as multiple apparatuses, systems, or devices. Computing system 900 includes, but is not limited to, processing system 901, storage system 903, software 905, communication interface system 907, and user interface system 909. Processing system 901 is operatively coupled with storage system 903, communication interface system 907, and user interface system 909. User interface system 909 is optional in some implementations. Processing system 901 loads and executes software 905 from storage system 903. When executed by processing system 901, software 905 directs processing system 901 to operate as described herein for any one or more of collaboration services 110 and 430 and collaboration applications 111, 113, 412, 414, 416, and 418, and optionally as described for any of the user interfaces and operational scenarios and sequences disclosed herein. Computing system 900 may optionally include additional devices, features, or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein as described with respect to the various architectures, operational scenarios, and operational sequences disclosed herein. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate enhanced collaboration as described herein for each implementation. Indeed, encoding software 905 on storage system 903 may transform the physical structure of storage system 903. The specific transformation of the physical structure may depend on various factors in different implementations of this description. Examples of such factors may include, but are not limited, to the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 and FIG. 4, through the operation of a computing system or systems of which computing system 900 is representative, transformations may be performed with respect to a user interface to a collaboration service, such as user interface 200 or 300. As an example, a user may navigate from home view 201 to collaboration view 301. In another example, a collaboration view may include session content, which is then updated by participants in a collaboration session, thereby changing the view. Other examples of transformations are possible and may be considered within the scope of the present disclosure.

It should be understood that computing system 900 is generally intended to represent a computing system or systems on which software 905 may be deployed and executed in order to implement enhanced collaboration. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof. In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. For example, user interface 200 or user interface 300 may be presented through user interface system 909. In addition, user input made with respect to user interface 200 or user interface 300 can be input via user interface system 909.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a collaboration service comprising:
   registering a plurality of users as participants in a collaboration session, including by registering at least a subset of the plurality of users with a plurality of service identities associated with the collaboration service and registering at least one user with a social network identity associated with a social network service;
   receiving session content from a first instance of a plurality of instances of a collaboration application associated with the plurality of users, wherein the session content is associated with one of the plurality of service identities associated with the collaboration service;
   sharing the session content with a second instance of the plurality of instances, wherein the second instance is an instance of the collaboration application that is hosted within the social network service and associated with the at least one user; and
   sharing, through a social network application hosted within the social network service and associated with the at least one user, session information descriptive of at least a portion of the session content.

2. The method of claim 1 wherein the social network service is external to the collaboration service.

3. The method of claim 2 wherein sharing the session information comprises sharing the session information through a feature of the social network service surfaced to the at least one user by the social network application, and wherein the method further comprises receiving additional session information associated with the at least one user and sharing the additional session information with the plurality of instances of the collaboration application.

4. The method of claim 1 wherein the sharing of the session content further comprises identifying that the session content is associated with social network identity.

5. The method of claim 1 wherein sharing the session information descriptive of the at least a portion of the session content comprises sharing the session content with a hosted instance of the plurality of instances of the collaboration application that is hosted in the social network service.

6. The method of claim 5 wherein the registering further comprises registering the social network identity of the at least one user via the hosted instance of the plurality of instances of the collaboration application.

7. The method of claim 1 wherein the session content comprises an update to a document, and wherein the session information comprises an alert that is descriptive of at least that the update to the document occurred.

8. A computing apparatus comprising:
one or more non-transitory computer readable storage media;
a processing system operatively coupled with the one or more computer readable storage media; and
program instructions stored on the one or more computer readable storage media for operating a collaboration service that, when executed by the processing system, direct the processing system to at least:
register a plurality of users as participants in a collaboration session, including by registering at least a subset of the plurality of users with a plurality of service identities associated with the collaboration service and registering at least one user with a social network identity associated with a social network service;
receive session content from a first instance of a plurality of instances of a collaboration application associated with the plurality of users, wherein the session content is associated with one of the plurality of service identities associated with the collaboration service;
share the session content with a second instance of the plurality of instances, wherein the second instance is an instance of the collaboration application that is hosted within the social network service and associated with the at least one user;
share, through a social network application hosted within the social network service and associated with the at least one user, session information descriptive of at least a portion of the session content.

9. The computing apparatus of claim 8 wherein the social network service is external to the collaboration service.

10. The computing apparatus of claim 9 wherein:
to share the session information, the program instructions direct the processing system to share the session information through a feature of the social network service surfaced to the at least one user by the social network application, receive additional session information associated with the at least one user, and share the additional session information with the plurality of instances of the collaboration application.

11. The computing apparatus of claim 8 wherein to share the session content, the program instructions further direct the processing system to identify that the session content is associated with the social network identity.

12. The computing apparatus of claim 8 wherein to share the session information descriptive of the at least a portion of the session content, the program instructions further direct the processing system to share the session content with a hosted instance of the plurality of instances of the collaboration application that is hosted in the social network service.

13. The computing apparatus of claim 12 wherein to register the plurality of users, the program instructions further direct the processing system to register the social network identity of the at least one user via the hosted instance of the plurality of instances of the collaboration application.

14. The computing apparatus of claim 8 wherein the session content comprises an update to a document, and wherein the session information comprises an alert that is descriptive of at least that the update to the document occurred.

15. One or more computer readable storage media having program instructions stored on the one or more computer readable storage media for operating a collaboration service that, when executed by a processing system, direct the processing system to at least:
register a plurality of users as participants in a collaboration session, including by registering at least a subset of the plurality of users with a plurality of service identities associated with the collaboration service and registering at least one user with a social network identity associated with a social network service;
receive session content from a first instance of a plurality of instances of a collaboration application associated with the plurality of users, wherein the session content is associated with one of the plurality of service identities associated with the collaboration service;
share the session content with a second instance of the plurality of instances, wherein the second instance is an instance of the collaboration application that is hosted within the social network service and associated with the at least one user;
sharing, through a social network application hosted within the social network service and associated with the at least one user, session information descriptive of at least a portion of the session content.

16. The one or more computer readable storage media of claim 15, wherein the social network service is external to the collaboration service.

17. The one or more computer readable storage media of claim 16, wherein to share the session information, the program instructions direct the processing system to share the session information through a feature of the social network service surfaced to the at least one user by the social network application, receive additional session information associated with the at least one user, and share the additional session information with the plurality of instances of the collaboration application.

18. The one or more computer readable storage media of claim 15, wherein to share the session content, the program instructions further direct the processing system to identify that the session content is associated with the social network identity.

19. The one or more computer readable storage media of claim 15, wherein the session content comprises an update to a document, and wherein the session information comprises an alert that is descriptive of at least that the update to the document occurred.

20. The one or more computer readable storage media of claim 15, wherein the to register, the program instructions further direct the processing system to register the social network identity of the at least one user via a hosted instance of the plurality of instances of the collaboration application.

* * * * *